RADIATION HARDENED RECORDING SYSTEM

Filed March 12, 1964

INVENTORS
CHARLES W. LUNDBERG
FRED G. HEWITT
RAYMOND H. JAMES
VINCENT J. KORKOWSKI
BY Thomas J. Nikolai
ATTORNEY

RADIATION HARDENED RECORDING SYSTEM

Filed March 12, 1964

United States Patent Office 3,432,818
Patented Mar. 11, 1969

3,432,818
RADIATION HARDENED RECORDING SYSTEM

Charles W. Lundberg and Fred G. Hewitt, St. Paul, Raymond H. James, Bloomington, and Vincent J. Korkowski, Minneapolis, Minn., assignors to Sperry Rand Corporation, New York, N.Y., a corporation of Delaware Filed Mar. 12, 1964, Ser. No. 351,413
U.S. Cl. 340—174 20 Claims
Int. Cl. G11b *5/00;* G01t *1/16;* H01j *39/00*

This invention relates to a means of recording a transient phenomenon by sampling at discrete intervals an electrical signal representative of such phenomenon and in particular to such a device whose record is not susceptible to nuclear radiation deterioration.

In recent years a considerable amount of time and effort has been expended upon the investigation of the effects of nuclear-weapon-burst and simulated-burst radiation on electronic components and semiconductor devices. Such work is principally concerned with the effects due to gamma ray and neutron bombardment of a transient radiation environment. Two reports—REIC Report No. 18, June 1, 1961 and REIC Report No. 26, Apr. 19, 1963, "Radiation Effects Information Center," Battelle Memorial Institute, Columbus, Ohio—cover this phase of the effects of nuclear radiation with a listing of probable component degradations. As pointed out in these above referenced reports, transient radiation effects on electronic components and semiconductor devices range from moderate to destructive with magnetic devices being the least susceptible to degradated performance.

Prolonged radiation such as in the immediate proximity of an active reactor affects magnetic properties much the same as prolonged heating. Those materials which owe their distinctive properties to special heat treatments are most rapidly and permanently affected by high energy radiation. Materials such as ferrites which have low Curie temperatures are impaired magnetically if their temperature rises excessively, either due to proximity to a heat source, or to internal conversion of radiant energy into heat. Otherwise, ferrites are notably immune to radiation damage, to either temporary or long time exposure.

With a magnetic device as an established radiation-hardened device (i.e., a device whose operating characteristics are substantially uneffected by intense gamma ray and neutron bombardment) the present invention provides a portable recorder that is light-weight, that requires no external power and that may be placed in a transient radiation environment along with the device to be tested. The recorder provides a highly reliable, recoverable record of the measured, or detected phenomenon (i.e., the effect upon the tested device) as a result of exposure to such an environment.

In the preferred embodiment of applicants' invention, a sensor detects, or monitors the effect upon the operating characteristics of the device being tested while both items, the device being tested and the recorder, are in the transient radiation environment. The recorder converts the monitored characteristics, which may be in the form of a transient electrical signal, into discrete data levels, each discrete data level indicative of the level of the signal sampled portion. These discrete data levels are stored in corresponding separate detectors which are preferably magnetic memory elements such as toroidal ferrite cores or transfluxors. Upon cessation of the intense radiation bombardment, the recorder may be removed from the test environment and taken to laboratory-type facilities where the information stored in the detectors is read out and presented in a directly useable form.

In comparison to the method of the detection of transient phenomenon in electronic components and semiconductor devices due to transient radiation effects as made possible by applicants' invention, present day methods are costly and cumbrous. Conventional methods involve the remote recording of such effects by magnetic tape devices and monitor oscilloscopes. However, consider a device to be tested which has, for example, fifty separate effects to be monitored. As each separate effect, or phenomenon, requires a separate recording device, i.e., a separate magnetic tape unit or oscilloscope, such a testing procedure could require the investment of hundreds of thousands of dollars to provide a useful analysis of the effects of the test. Further, frequency response of these recording devices—as the monitored characteristic is a non-cyclical transient electrical signal of microsecond duration—is insufficient to provide an accurate analysis of the initial reaction of the operating characteristics of the tested device to the transient radiation bombardment.

The uncertainty in the knowledge of actual nuclear weapon-burst bombardment radiation spectrum, real-time history and the relative effects of neutrons, gamma rays and neutron-induced gamma rays has made it difficult to calculate vulnerability numbers for simulated effects. Recent developments in effects measurements such as secondary photocurrent in transistors and neutron effects in capacitors have made it even more important to determine the response of components and circuits to an actual weapon radiation environment. Such a determination requires a low-cost recorder that is easily hand-carried and self-contained so that it could be placed in the radiation environment to monitor radiation effects at a plurality of locations from the radiation source. Real-time bunker-installed devices such as magnetic tape units and monitor oscilloscopes with cable connections to radiation sensors have been the only recording devices utilized up to the present time. However, as each item of data to be recorded requires a separate recording device, the use of such devices requires a near-prohibitive expense. Additionally, the electro-magnetic fields accompanying actual weapon-burst bombardment radiation often causes complete destruction of the monitored signals through adverse effects upon the cabling coupling the monitored signal to the recording device. Consequently, a serious need has developed for a low-cost, portable, real-time recorder that is completely self contained and that requires no radiation shielding. The present invention provides a device whose recorded monitored data is substantially insensitive to a peak gamma-radiation pulse of $10^{10}$ ergs $g.^{-1}$ (C) $sec.^{-1}$ ($10^{10}$ ergs per gram per second references to carbon), thermal shocks below the magnetic storage device's Curie temperature, overpressure, blast, electro-magnetic field and ground shock.

Additionally, the effects of high energy electrons on semiconductor devices are currently of great interest because of increasingly frequent exposure of satellite space craft with electronic equipment to the Van Allen radiation belts. The present invention provides a device that could be exposed to such radiation and which would provide a recoverable record of the characteristics of such radiation belts.

Accordingly, it is a primary object of the present invention to provide a portable radiation-hardened recorder of transient phenomena due to intense transient nuclear radiation bombardment.

Another object of the present invention is to provide a recorder whose recorded information is substantially uneffected by gamma ray and neutron bombardment of a transient radiation environment.

Another object of the present invention is to provide a portable radiation-hardened recorder of transient phenom-

[redacted]

niques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a stabilized condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on read-out of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is less than the flux density of the second stable-state normally used for conventional, or amplitude-limited operation. The second stable-state may be fixed in position by the asymmetry of the two drive field durations and by the procedure of preceding each second drive field duration with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, Supplement, vol. 32, No. 3, pp. 38S–39S, March 1961, provides excellent background material for the switching technique utilized in the present invention.

The magnetic conditions and their definitions as discussed above may now be itemized as follows:

*Partial switching*

Amplitude-limited—condition wherein with a constant drive field amplitude, increase of the drive field duration will cause no appreciable increase in core flux density.

Time-limited—condition wherein with a constant drive field amplitude, increase of the drive field duration will cause appreciable increase in core flux density.

*Complete switching*

Saturated—condition wherein increase of the drive field amplitude or duration will cause no appreciable increase in core flux density.

Stable-state—condition of the magnetic state of the core when the core is not subjected to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The preferred embodiment of the present invention is concerned with the establishment of a predeterminably variable magnetic flux level in a magnetizable memory device which flux level is representative of the amplitude of an incremental portion of a transient electrical signal. In the preferred embodiment an incremental portion of a transient signal from a first constant current source is gated into the magnetic device by a strobe pulse from a second constant current source. The maximum amplitude of the transient signal is limited to a level well below the switching threshold of the magnetic device such that the transient signal alone is incapable of effecting the flux level of the magnetic device. The strobe pulse is of an amplitude sufficient to switch the flux state of the magnetic device from a first saturated state to a second and opposite saturated state but is of such a limited duration so as to preclude such complete flux reversal. However, such duration is sufficient to set the flux level in an intermediate time-limited flux state. Different incremental portions of the transient signal may be gated into the magnetic device by delaying the transient signal different time increments with respect to the strobe pulse; each different time delayed increment of the transient signal is gated by the strobe pulse into a separate magnetic device so that each separate magnetic device stores a flux level representative of the net magnetomotive force effect of the strobe pulse and that portion of the transient signal gated by the strobe pulse. The terms "signal," "pulse," etc., when used herein shall be used interchangeably to refer to the current signal that produces the corresponding magnetic field and to the magnetic field produced by the corresponding current signal.

Accordingly, it is a primary object of the present invention to provide a system and a method for the sampling of a constant current source transient electrical signal.

It is a further object of the present invention to provide a system and a method for the flux gating of an incremental portion of a constant current source transient electrical signal by a constant current source time-limited strobe pulse.

It is a further object of the present invention to provide a system and a method whereby an electrical signal is sampled by a strobe pulse wherein the duration of the sampled portion of the electrical signal is determined by the duration of the strobe pulse.

It is a further object of the present invention to provide a novel method of sampling the radiation intensity of a nuclear-radiation environment and storing each of a plurality of such samples as a partially-switched flux level in an associated magnetizable detector.

It is a further and more general object of the present invention to provide a novel method of operating a magnetizable memory element as an electrical signal sampling device.

These and other more detailed and specific objects will be disclosed in the course of the following specification, reference being had to the accompanying drawings, in which.

Figure 1:
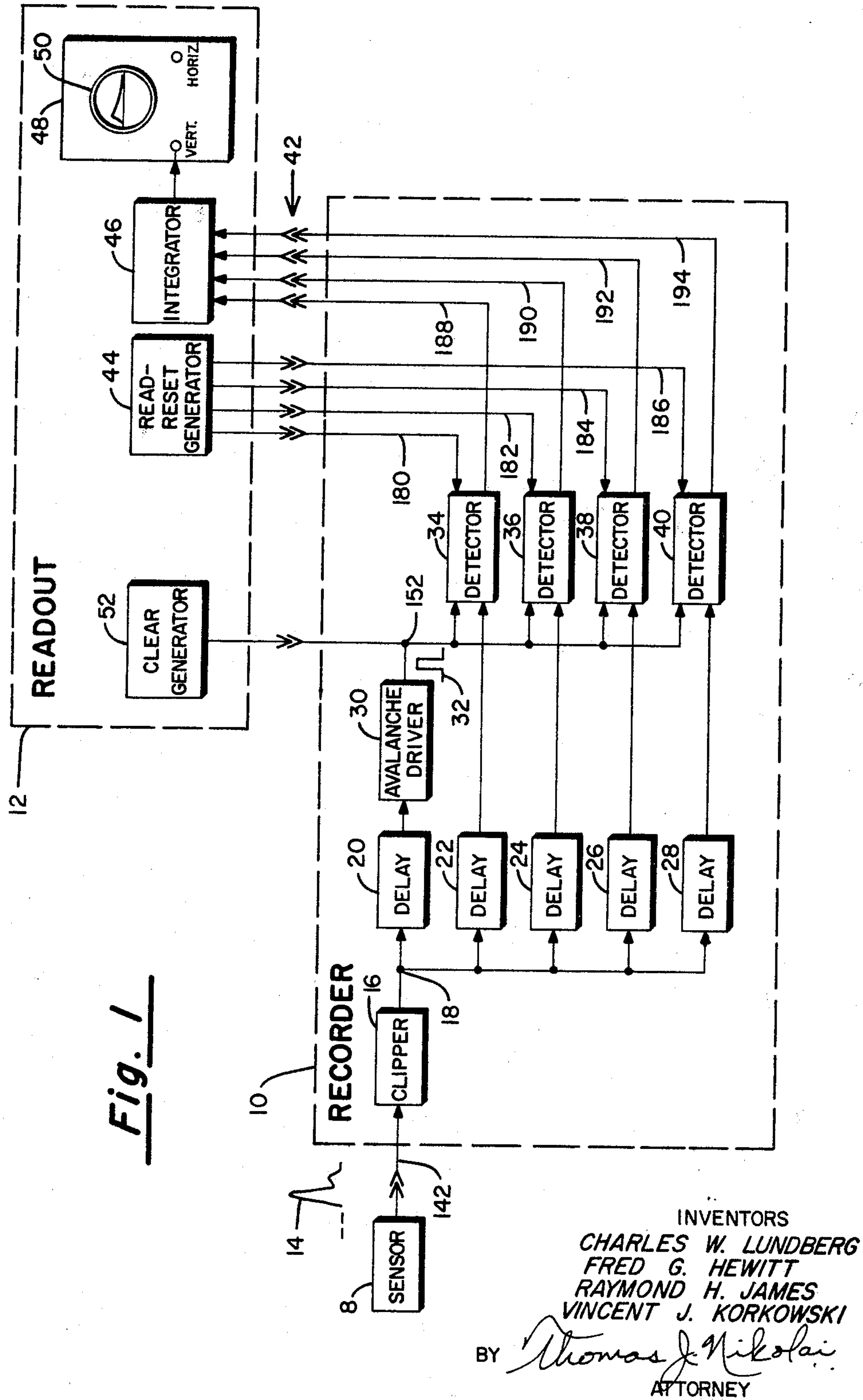
FIG. 1 is a block diagram of a preferred embodiment of a transient recorder and readout system incorporating the concepts of the present invention.

With particular reference to FIG. 1 there is disclosed a block diagram of a preferred embodiment of a low-cost, portable, real-time recorder that is completely self contained requiring no external power supply or control means. This preferred embodiment is substantially resistant over its operating range to an intense nuclear blast environment and, as there is no shielding provided therewith, its constituent components must operate satisfactorily under such conditions. The embodiment of FIG. 1 essentially consists of three elemental parts: the separate sensor 8 that generates a constant current source transient electrical signal that defines the sensed phenomenon; the portable recorder 10 that converts the transient electrical signal into discrete data levels, each data level indicative of the signal amplitude of a sampled portion of said transient signal, and stores each data level in corresponding separate detectors; and, the laboratory type readout system 12 that provides the necessary input control signals and output devices that permit readout and evaluation of the data stored in the detectors of recorder 10.

In the embodiment of FIG. 1 sensor 8 couples a transient signal, for example signal 14, to clipper 16 of recorder 10 which in turn couples its output signal to node 18 which is a point providing a common electrical input to the remainder of recorder 10. Clipper 16 is in this embodiment serially arranged between the sensor 8 and node 18 and is included to limit the maximum, or peak, level of signal 14 to that level that can be accommodated by the subsequently parallel aligned delay-detector sets. Signal 14 at node 18 is coupled to parallel arranged delays 20, 22, 24, 26 and 28. Delays 22–28 may each delay signal 14 an appropriately different time such as D, 3D, 5D, and 7D, respectively, and accordingly delay 20, if the recorder 10 is to record the wave front of signal 14, would provide a delay 7D equal to the longest delay provided by any of delays 22–28. Delay 20 couples the delayed signal 14 to avalanche driver 30 which generates a strobe pulse 32. Strobe pulse 32 performs the function of a gate, gating into detectors 34, 36, 38 and 40 those portions of signal 14 from the different delays of delays 22–28, respectively, which are concurrent with strobe pulse 32. Accordingly, detector 40 having the same delay as delay 20 would sample the wavefront of signal 14 over the duration of strobe pulse 32 while detectors 38, 36 and 34 would sample signal 14 over the duration of strobe pulse 32 at delays of 2D, 4D and 6D, respectively.

Once the information is stored in recorder 10, readout system 12 may be utilized to read out and evaluate such information. With readout system 12 coupled to recorder 10 at connector 42, read-reset generator 44 couples the proper read signal individually and selectively to detectors 34–40. Output signals indicative of the information stored in detectors 34–40 are, upon the separate coupling of the read signal thereto, coupled to integrator 46 which integrates the output signals from detectors 34–40 providing a representative signal which is coupled to the vertical input terminal of oscilloscope 48. The signal trace on oscilloscope face 50 is then capable of evaluation as to the signal amplitude defining the level of the information stored in the respective detector. Alternatively, the output of integrator 46 could be coupled to a signal analyzer that could provide a direct reading of the level of the information stored in the respective detector. After evaluation of the stored information, clear generator 52 couples a clear signal to detectors 34–40 clearing the information stored therein and preparing them for a subsequent recording operation.

Figure 2:
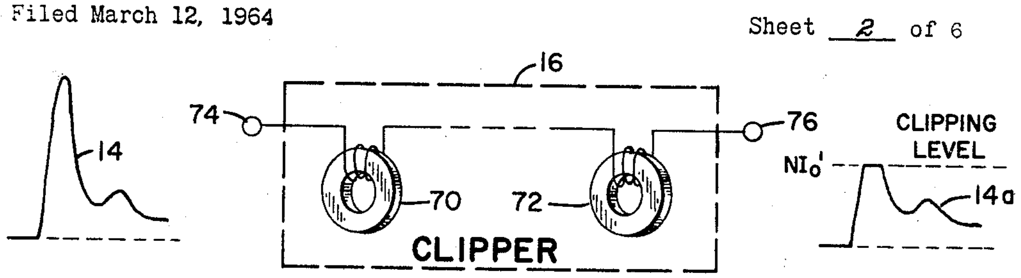
FIG. 2 is an illustration of a magnetic clipper that may be used with the recorder of FIG. 1.

With particular reference to FIG. 2 there is disclosed an illustration of a magnetic clipper which may be utilized as clipper 16 of FIG. 1. In this embodiment it is the purpose of clipper 16 to clip off, or remove, that portion of the input signal 14 whose amplitude is larger than the storage capacity of the associated detector. Cores 70 and 72 may be typical bistable ferrite cores whose switching threshold is equal to $NI_0'$. Prior to any recording, cores 70 and 72 are set into the negative saturated remanent magnetic state by a clear pulse such as that from clear generator 52 which is of a negative saturating current pulse sense. A positive current pulse, such as signal 14, having no portion thereof greater than $NI_0'$ when coupled to input terminal 74 would pass uneffected-except for a possible increase in rise time—through clipper 16 and would be emitted at terminal 76. However, any portion of signal 14 greater than $NI_0'$ would cause the magnetic flux of cores 70 and 72 to be switched toward the positive saturated remanent magnetic state. Concurrent with this flux reversed, a back EMF will be induced in the turns about the cores which EMF is in opposition to the incoming signal 14. The resultant output at terminal 76 will effectively consist of signal **14*a* which ideally is that portion of the incoming signal 14 whose amplitude does not exceed the MMF of $NI_0'$. The clipping level $NI_0'$ for a given core is dependent upon the number of turns about the core; the amount of clipping of the incoming signal 14** is determined by $N\phi$, where $\phi$ is the volt-time integral of the core per turn and N is the number of turns about the core.

Figure 3:
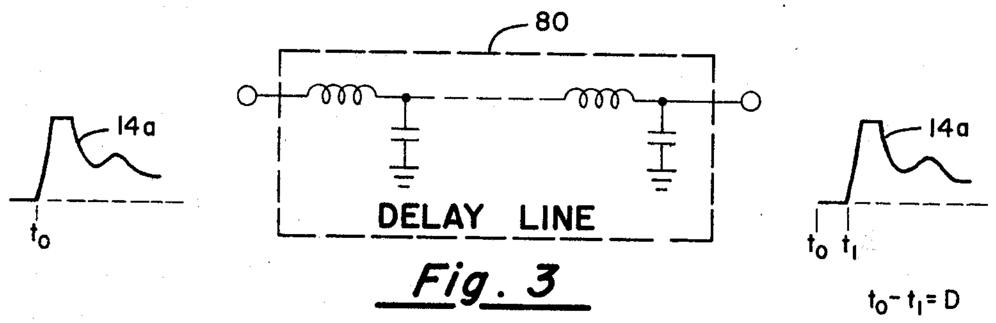
FIG. 3 is an illustration of a delay line that may be used with the recorder of FIG. 1.

With particular reference to FIG. 3, there is disclosed an illustration of a lumped constant delay line that may be utilized as the delays of FIG. 1. In this embodiment delay line 80 is made up of a cascaded series of LC sections the parameters of which are adjusted to provide the delays of D, 3D, 5D, 7D . . . *n*D. Although a lumped constant delay line is illustrated any appropriate form of delay line may be utilized. See the text "Pulse and Digital Circuits" McGraw-Hill, pp. 286–321 for an excellent discussion of delay line theory.

Figure 4:
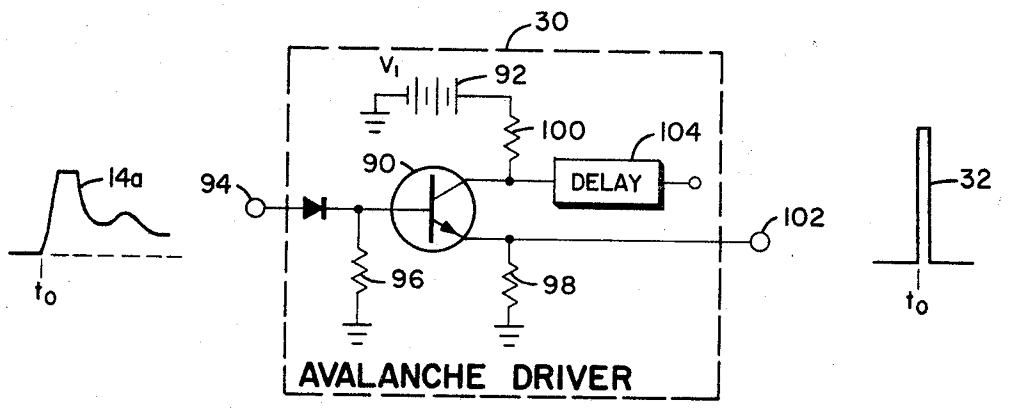
FIG. 4 is an illustration of an avalanche driver transistor amplifier that may be used with the recorder of FIG. 1.

With particular reference to FIG. 4, there is disclosed an illustration of an avalanche driver that may be utilized as driver 30 of FIG. 1. In this embodiment it is the purpose of driver 30 to generate strobe pulse 32 upon activation by signal 14. As recorder 10 is primarily for the purpose of recording sampled portions of a transient signal while in an environment of intense nuclear radiation, recorder 10 is considered to be a one-shot recording device. That is, the recorder is to be exposed to a single transient signal, to record sampled portions thereof and then to have the stored data read out in laboratory type facilities by readout system 12 prior to exposure to a subsequent transient signal. As the radiation environment may have a permanent degrading effect upon the operating characteristics of avalanche transistor 90 and battery 92, such components are considered to be expendable items and may, if necessary, be replaceable parts to be replaced after each exposure to the radiation environment.

With no signal coupled to terminal 94 of driver 30, transistor 90 is reverse biased into the normal nonconducting mode by the biasing arrangement of resistors 96, 98 and 100 and the positive voltage source of battery 92 providing a zero voltage signal at output terminal 102. The capacitors of open ended delay line 104 (see FIG. 3) are then charged to a potential of approximately 130 volts by battery 92 through resistor 100. When signal 14 is coupled to terminal 94 the collector-base electrode junction of transistor 90 is reverse biased beyond its avalanche breakdown potential and the collector-emitter electrode junction breaks down causing it to appear as a short circuit to the charge stored in the capacitors of delay line 104-resistor 100 is of a large value, such as 100,000 ohms, such that battery 92 is effectively isolated from transistor 90 during this breakdown period. Additionally, the circuit of FIG. 4 is capable of avalanche breakdown upon exposure to a radiation burst of the proper characteristic. If such a radiation burst is expected signal 14 need not be coupled to avalanche driver 30 but delay 20 would then be coupled between avalanche-driver 30 and the detectors delaying the strobe pulse rather than transient signal 14. Delay line 104 then discharges through the collector-emitter electrode junction of transistor 90 to ground through resistor 98 causing a high amplitude signal 32 to appear at terminal 102. The delay line 104 continues to discharge through resistor 98 over a period twice the delay of delay line 104. Consequently, with a desired strobe pulse duration of, for example, 50 ns. (nanoseconds), the delay of delay line 104 is 25 ns. After this time delay line 104 is ineffective to hold the collector-emitter electrode junction of transistor 90 in its avalanche mode and transistor 90 reverts to its non-conducting mode again causing a zero potential signal to appear at terminal 102.

Figure 6:
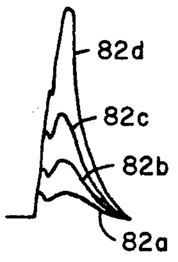
FIG. 6 illustrates a set of typical readout signal waveforms from the detectors of the recorder of FIG. 1.
Figure 5:
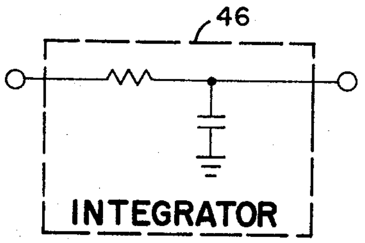
FIG. 5 is an illustration of an integrator that may be used with the readout system of FIG. 1.
Figure 7:
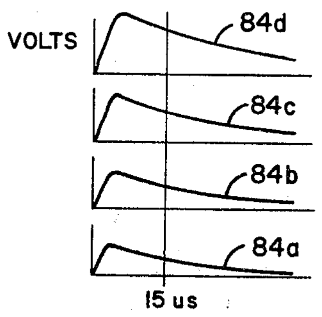
FIG. 7 is a diagram of a set of typical displays upon the face of the oscilloscope of FIG. 1 for the corresponding waveforms of FIG. 6.

With particular reference to FIG. 5 there is disclosed an illustration of an integrator that may be utilized as integrator 46 of FIG. 1. In this embodiment it is the purpose of integrator 46 to integrate the output signals of detectors 34–40 and to provide thereby a signal whose waveform can provide a reliable means of calibrating such detector output signals to provide a satisfactory correlation of the level of the data stored in the respective detector with a measured output signal amplitude. In one method of achieving such correlation, detector output signals **82*a*, 82*b*, 82*c* and 82*d* of FIG. 6, each representative of a different level of data stored in detectors 40, 38, 36, 34, respectively, when integrated by integrator 48 produced the integrator output signals 84*a*, 84*b*, 84*c* and 84*d*, respectively, of FIG. 7. Upon the observation and calibration of signals 84*a*, 84*b*, 84*c* and 84*d* as displayed upon oscilloscope face 50** it was determined that the amplitudes of such signals after a certain delay time, for example at a time 15 μs (microseconds) after their wavefronts, were in direct correlation with the levels of the data stored in the respective detectors.

To better understand a novel aspect of the present invention, a discussion of a constant current source driving signal as opposed to the use of a constant voltage source driving signal is presented.

Figure 8:
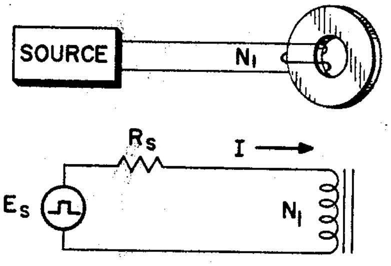
FIG. 8 is an illustration of the general circuit and its equivalent schematic of a source driving a toroidal ferrite core.

A constant voltage source is a source whose output voltage level is independent of the applied load while a constant current source is a source whose output current level is independent of the applied load. FIG. 8 illustrates the general circuit of a source driving a toroidal ferrite core with its equivalent circuit:

$E_s$=source voltage
$R_s$=source internal resistance
$N_1$=number of turns in the coil about the core
I=current flowing through the coil about the core This circuit may be defined mathematically by Equation 1

$$E_s=IR_s-N\frac{d\phi}{dt} \tag{1}$$

with it being assumed that the core is always initially in its negative saturated state and that the drive signal from the source drives the magnetic state of the core toward its positive saturated state. By making $R_s$ sufficiently small, Equation 1 reduces to Equation 2.

$$E_s\cong=N\frac{d\phi}{dt} \tag{2}$$

Therefore by making $R_s$ sufficiently small the conditions of a constant voltage source are fulfilled. Since $E_s$ and N are constants, $d\phi/dt$ is also a constant, and consequently the flux reversal is a linear function of time.

$$\int_{-\phi_s}^{\pm\phi_1} d\phi=\frac{E_s}{N_1}\int_0^t dt$$
$$\phi_s-\phi_1=E_st/N_1 \tag{3}$$

For a complete flux reversal the integral, taken from $-\phi_s$ to $+\phi_s$, is (with $T_s$=time required for a complete flux reversal from $-\phi_s$ to $+\phi_s$)

$$\int_{-\phi_s}^{+\phi_s} d\phi=\frac{E_s}{N_1}\int_0^{T_s} dt$$
$$2\phi_s=E_sT_s/N_1 \tag{4}$$

The voltage E induced in any coil about the core is (with $N_2$=the number of turns of a second coil on the core).

$$E=\frac{E_sN_2}{N_1}=\frac{2\phi_s}{T_s}N_2$$

Figure 10:
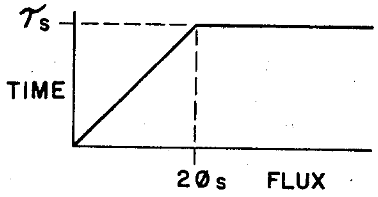
FIG. 10 is an illustration of the plot of flux versus time of the core of FIG. 8.
Figure 9:
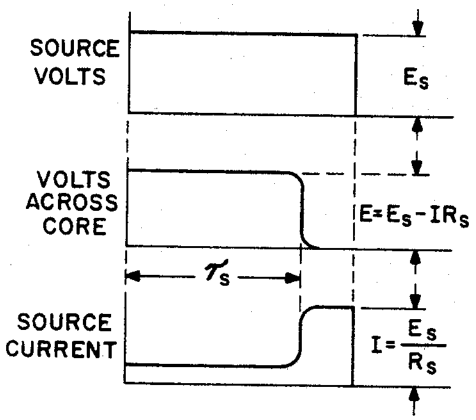
FIG. 9 is an illustration of the resulting voltages and currents of the circuit of FIG. 8 when driven by a constant voltage source.

The resulting voltages and currents under constant voltage source conditions are illustrated in FIG. 9, Equations 3 and 4 show that a plot of flux $\phi$ versus time would be as illustrated in FIG. 10. It is under these constant voltage source conditions that a toroidal ferrite core can be used as a counter, integrator or accumulator. See Patent Nos. 2,968,796 and 2,808,578 for typical uses of this principle of a constant voltage source. It is to be noted that the linear relationship of the plot of flux $\phi$ versus time over the range of $0<\phi<2\phi_s$ as illustrated in FIG. 10 is due to the characteristics of the constant voltage source rather than those of the core.

If $R_s$ is made sufficiently large, Equation 1 reduces to Equation 5.

$$E_s\cong IR_s \tag{5}$$

Figure 11:
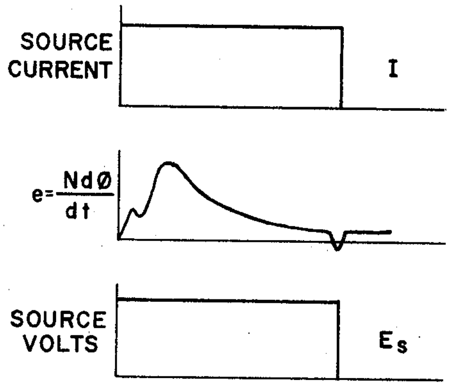
FIG. 11 is an illustration of the resulting voltages and currents of the circuit of FIG. 8 when driven by a constant current source.

Therefore, by making $R_s$ large, the conditions of a constant current source are fulfilled. From inspection of Equation 5 it is apparent that the constant current source has an insignificant effect on the flux reversal or the rate of flux reversal in the core. Under these conditions the flux reversal can be thought of as the intrinsic magnetic behavior of the core with the resulting voltages and currents under constant current source conditions as illustrated in FIG. 11. It is under these constant current source conditions that this present invention is concerned.

Figure 12:
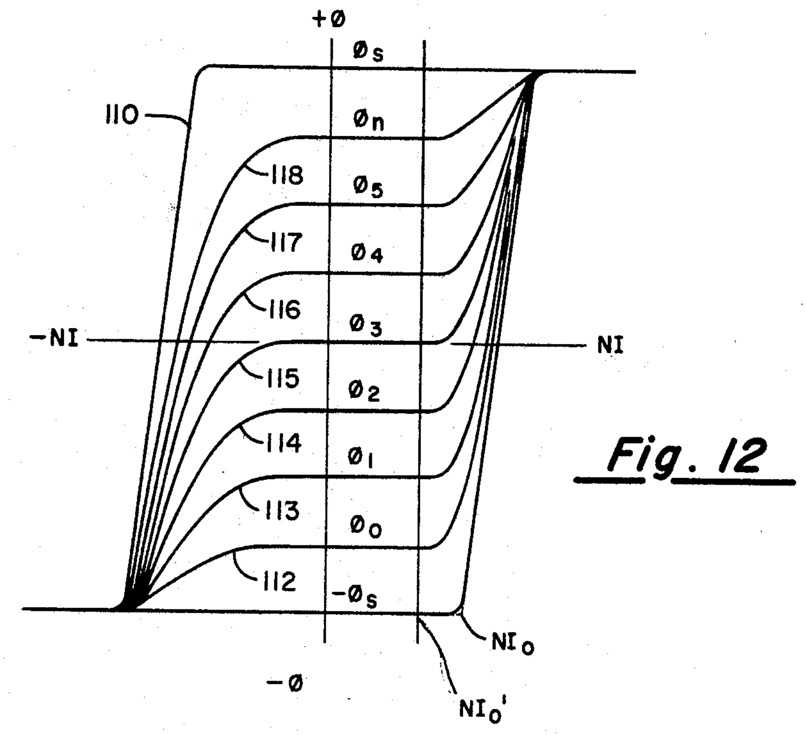
FIG. 12 is an illustration of the residual magnetization of the core of FIG. 8 utilizing the time-limited different-amplitude flux sampling strobe pulses of the present invention.

A phenomenological understanding of a time-limited flux state in a toroidal core, or the flux path about an aperture in a plate of magnetizable material such as a transfluxor, can be obtained by considering the flux distribution therethrough. The switching time $\tau_s$, or the time required for complete flux reversal from a first flux saturated state to a second and opposite flux state is given as follows:

$$\tau_s=\frac{S_w}{H-H_0}=\frac{S_{w'}}{NI-NI_0}$$

where $r$=radius of toroidal core
$\tau_s$=switching time
I=current in amperes
$S_w$=material constant
N=number of turns
H=applied field in oe. (oersteds)$=NI/5r$
$H_0$=switching threshold in oe$=NI_0/5r$
$Sw'=Sw5r$ Since the applied field H is inversely proportional to the radius of the core, flux reversal takes place faster in an inside ring of the core than in an outside ring of the core. Applying a time-limited drive field to the core results in a flux reversal distribution which decreases with increase in radial distance. That portion of the core which is in a partial switched state exhibits magnetic properties which are similar to a demagnetized state except for the asymmetry as illustrated in FIG. 12. The amount of asymmetry and the shape of the curve for a time-limited state are functions of both the drive field amplitude and duration.

With particular reference to FIG. 12 there is illustrated a residual magnetization curve 110 of the magnetic devices utilized by the present invention. Curve 110 is a plot of the irreversible flux $\phi$ versus the applied magnetomotive force NI where the duration of the current pulse is always greater than the switching time $\tau_s$ of the core, e.g., the applied field is of a sufficient duration to switch the magnetic state of the core from a first saturated remanent magnetic state, such as $-\phi_s$, into a second and opposite saturated remanent magnetic state, such as $+\phi_s$.

Curves 112–118 are the residual magnetization amplitude-limited curves from the respective time-limited stable-states $\phi_0$—$\phi_n$. As stated before, this time-limited partially-switched stable-state is obtained by terminating the saturating drive field current pulse before the flux reversal, as an example movement of the flux state from $-\phi_s$ to $+\phi_s$, has been completed. Then by applying drive field current pulses of different amplitudes and of a duration greater than the longest $\tau_s$ a family of curves 112–118 is obtained.

In the particular application of applicant's illustrated embodiment there is utilized a strobe pulse 32 (see FIG. 13) which is of a sufficient amplitude but of insufficient duration to switch the magnetic state of the coupled core from $-\phi_s$ to $+\phi_s$. This strobe pulse 32 is obtained from a constant current source and is limited in duration, e.g., time-limited, so as to set the magnetic state of the core in the flux state $\phi_0$ of curve 112. Any increase in the amplitude of pulse 32 causes the magnetic state of the coupled core to be set into a different greater flux state such as $\phi_1$—$\phi_n$ associated with curves 113–118, respectively.

Figure 14:
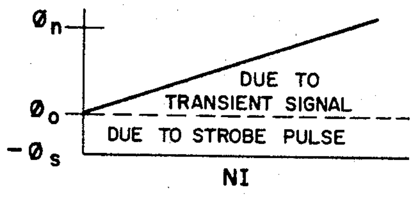
FIG. 14 is an illustration of the linearity of the plot of applied drive field and induced flux in a magnetizable memory element when operating from a constant current source as disclosed by the present invention.

With particular reference to FIG. 14 there is illustrated the linear relationship, over the range $\phi_0$—$\phi_n$, of the stable-state flux level and the strobe pulse amplitude. In applicant's present invention this variation of the strobe pulse amplitude is achieved by the concurrent action of a constant amplitude strobe pulse and a variable amplitude transient signal. The change in flux level is adjusted to be a linear function of that portion of the transient signal that is concurrent in time with and gated by the strobe pulse.

Figure 13:
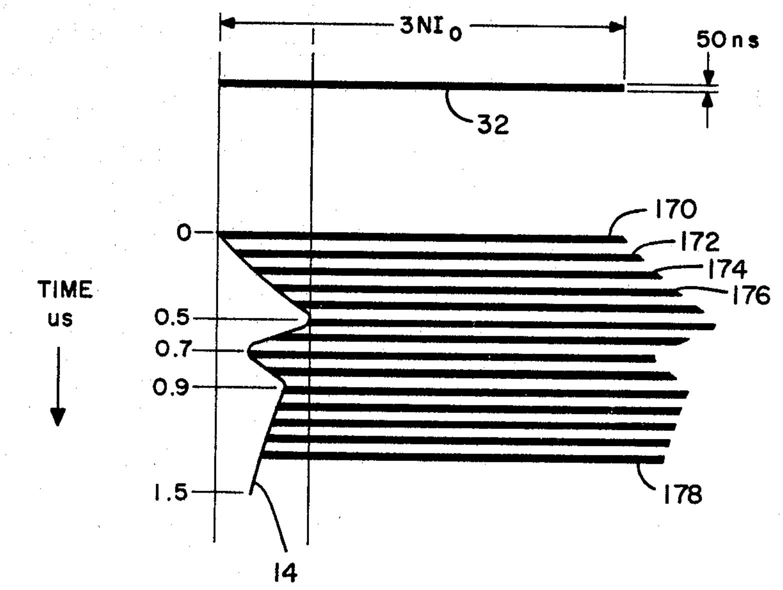
FIG. 13 is an illustration of a plot of a series of varying delayed strobe pulses upon a transient signal.

The present invention is concerned with a system utilizing a detector for and a method of sampling a transient current signal using the partial switching of a magnetic device. With particular reference to FIG. 13 there is illustrated a typical transient signal 14 which is to be sampled at any one or a plurality of times. Signal 14 is assumed to originate in a constant current source and is, in this embodiment, limited to a unidirectional signal whose maximum NI as regards the coupled magnetic device is less than $NI_{0'}$, the switching threshold. Of course, no such limitation is intended herein for a bidirectonal signal of less than $NI_{0'}/2$ operating about a bias of $NI_{0'}/2$ could be utilized.

With particular reference to FIG. 1, there is illustrated a block diagram of a recorder system whereby such sampling may be accomplished. Assume that the sensor 8 detects a transient phenomenon such as a nuclear weapon burst whose radiation intensity versus time characteristic is defined by signal 14. Signal 14 is coupled to line 142 which after passing unaffected through clipper 16 is in turn coupled to parallel arranged delays 20, 22, 24, 26 and 28 at node 18. Delays 22, 24, 26 and 28 may each delay signal 30 an appropriate time such as D, 3D, 5D, and 7D, respectively, and accordingly delay 20 and avalanche driver 30 after a delay 7D, equal to the longest delay provided by the parallel arranged delays 22, 24, 26 and 28 would emit strobe pulse 32 which is simultaneously coupled by way of conductor 152 to detectors 34, 36, 38 and 40. Strobe pulse 32 acts as a constant current source flux gate gating into detectors 34, 36, 38 and 40 that portion of signal 14 which is concurrent with pulse 32. Accordingly, delay 28-detector 40 set having the same delay as delay 20 would sample the wave front of signal 14 over the duration of strobe pulse 32 while detectors 38, 36 and 34 would sample signal 14 beginning at delays of 2D, 4D and 6D, respectively, over the duration of strobe pulse 32. As the present invention utilizes strobe pulse 32 as a flux gate to the sampled portion of signal 14 the information stored in detectors 34, 36, 38 and 40 would be the net effect of the magnetomotive force of strobe pulse 32 and that magnetomotive force of that concurrent portion of signal 14 from the various delays 22, 24, 26 and 28. As an example: in detector 40 the greatest delayed signal 14 of 7D is gated by the delayed strobe signal 32 of 7D to sample the leading edge of signal 14 as at pulse 170 of FIG. 13; in detector 38 the next greater delayed signal 14 of 5D is gated by the delayed strobe signal 32 of 7D to sample signal 14 at a delay of 2D as at pulse 172; in detector 36 the next greater delayed signal 14 of 3D is gated by the delayed strobe signal 32 of 7D to sample signal 14 at a delay of 4D as at pulse 174; while in detector 34 the least delayed signal 14 of D is gated by the delayed strobe signal 32 of 7D to sample signal 14 at a delay of 6D as at pulse 176.

As a further example, assume that the system of FIG. 1 contains 14 serially arranged delay-detector sets, such as the set formed by delay 22-detector 34, that strobe pulse 30 is 50 ns. (nanoseconds) or 1D in duration and that each delay-detector set delayed signal 130 an additional increment 2D of 100 ns., i.e., the longest delay is $(2n-1)D$ or 27D or 1.35 $\mu$s. (microseconds). Avalanche driver 30 would emit a strobe pulse 32 1.35 $\mu$s. after the coupling of signal 14 thereto causing the wave front of signal 14 to be sampled by the delay-detector set having the longest and similar delay as at pulse 170. The delay-detector sets having the progressively less delay of signal 14 would have progressively delayed samples of signal 14 as at pulses 172, 174, 176, etc., until the delay-detector set having the least delay of signal 14 would have the greatest delayed sample of signal 14 as at pulse 178. At this time the fourteen detectors would each have stored therein discrete levels of flux, each level indicative of the amplitude of the sampled portion of signal 14. Subsequent to the sampling procedure outlined above, the information stored in each detector could be read out by coupling a read, or interrogate, signal thereto as at read-out means 180, 182, 184 and 186 causing an output signal representative of the flux level stored in each detector to be coupled to the output means 188, 190, 192 and 194 of detectors 34, 36, 38 and 40 respectively.

Figure 15:
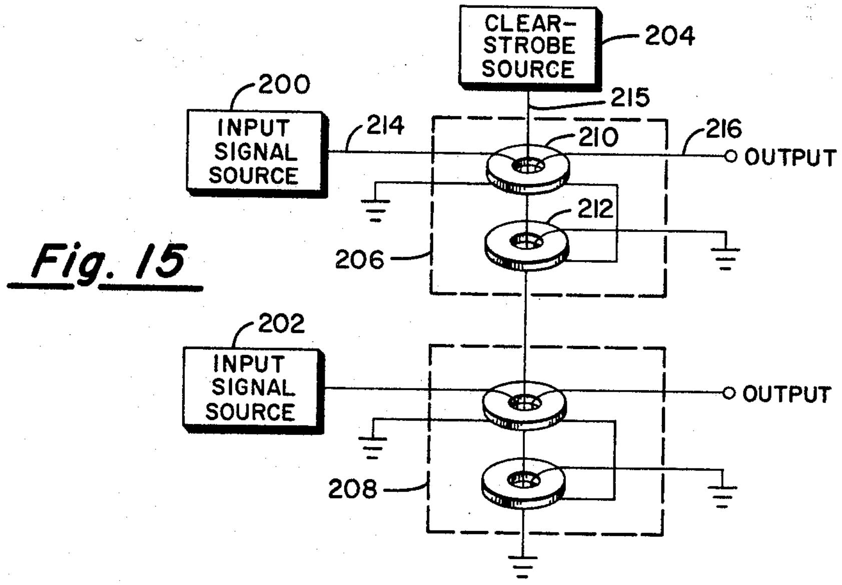
FIG. 15 is an illustration of a first embodiment of the present invention using toroidal ferrite cores as the detector elements.
Figure 16:
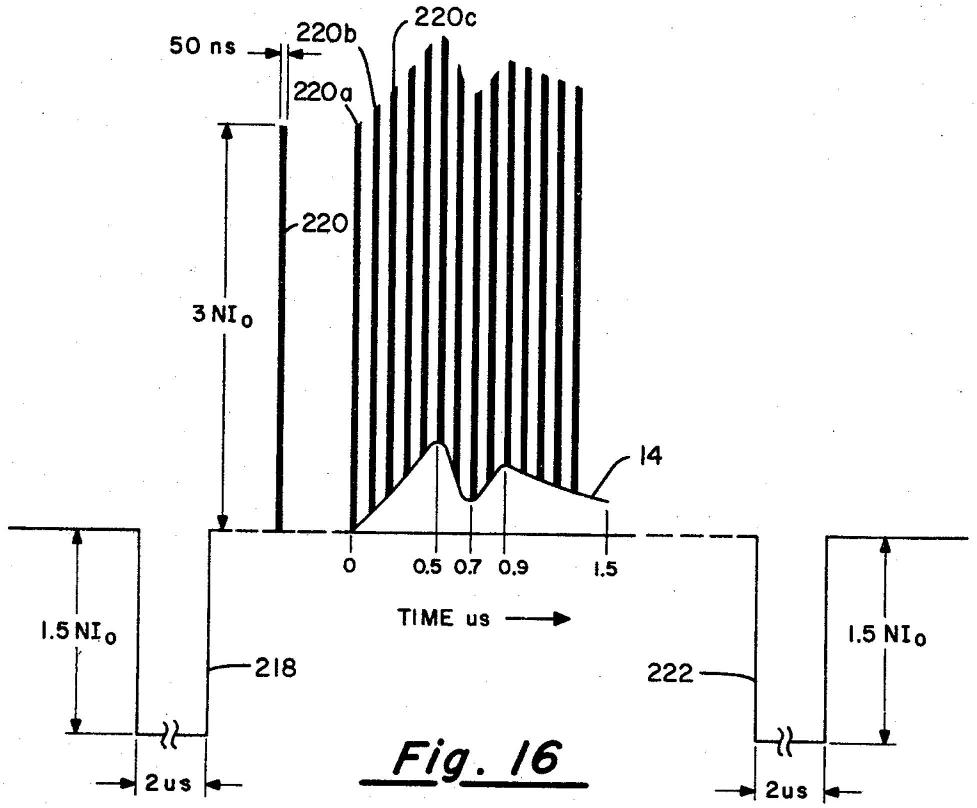
FIG. 16 is an illustration of the control signals associated with the embodiment of FIG. 15.

With particular reference to FIGS. 15 and 16 there is disclosed another embodiment of the present invention wherein the detectors are toroidal ferrite cores providing destructive readout of the information stored therein. Input signal sources 200 and 202 could be any constant current transient signal source but here are analogous to delays 22 and 28 while clear-strobe source 204 is analogous to avalanche driver 30 and clear generator 52 and detectors 206 and 208 are analogous to detectors 34 and 40 of FIG. 1. Detector 206, as in detector 208, includes two cores; information core 210 and buck-out core 212. The signal defining the information to be stored in detector 206 is coupled only to core 210 in a first magnetic sense from source 200 by way of conductor 214 while the clear-strobe signal from source 204 is coupled to cores 210 and 212 in the same first magnetic sense by way of conductor 215 and the output conductor 216 is coupled to cores 210 and 212 in the first and a second and opposite magnetic sense, respectively.

The use of buck-out core 212 simplifies the readout process and allows a greater variation in strobe pulse characteristics as follows. Preparatory to the sampling operation, cores 210 and 212 are initially set into a clear state such as $-\phi_s$ of FIG. 12 by the coupling of clear pulse 218 (see FIG. 16) to conductor 215. Next, for the sampling operation, signal 14 is coupled to conductor 214 concurrently with the relatively delayed coupling of strobe pulse 220 to conductor 215. As the information signal 14 is coupled only to core 210 and as the strobe pulse 220 is coupled to both cores 210 and 212, each core is effected by a different magnetomotive force. Core 212, which is effected only by strobe pulse 220 is, for example, placed in the $\phi_0$ (see FIG. 12) state while core 210 which is effected by both signal 14 and strobe pulse 220 is placed in a state of greater flux reversal such as for example $\phi_1$. Upon readout, clear-strobe source 204 couples to conductor 204 read pulse 222, which is of the same magnetic in a state of greater flux reversal such as for example $\phi_1$. Upon readout, clear-strobe source 204 couples to conductor 204 read pulse 222, which is of the same magnetic sense as regards cores 210 and 212 and of the same amplitude-duration characteristic as is the clear pulse 218, causing both cores 210 and 212 to be placed back into their original $-\phi_s$ state. This change of the flux states of cores 210 and 212 from $\phi_1$ and $\phi_0$, respectively, back to their original flux state $-\phi_s$ produces a net flux change $\phi_1-\phi_0$ due to the oppositely wound sensee of conductor 216 about cores 210 and 212. This difference flux then is the effective output-signal-producing-flux-change and accordingly produces an output signal which is substantially independent of the strobe signal 220 characteristics, and which is indicative of the amplitude of the sampled portion of signal 14.

As with the above described operation of the system of FIG. 1 the signals from sources 200 and 202 could be signal 14 delayed various delay times while the strobe pulse 220 could be delayed, preferably, at least as long as the longest delay of signal 130. As illustrated in FIG. 1 with the use of fourteen detectors, such as detectors 206 and 208, and fourteen input sources, such as input sources 200 and 202, a first input source delaying signal 14 a time $D$=50 ns. and each other input source providing a delay of an additional $2D$=100 ns. and with strobe pulse 220 being delayed an amount equal to the greatest delay of 1.35 $\mu$s., the successive magnetomotive forces of pulses 220$a$, 220$b$, 220$c$, etc., would be coupled to the detectors 206, 208, etc., at successively increasing delay times with respect to the wave front of signal 14.

Figure 17:
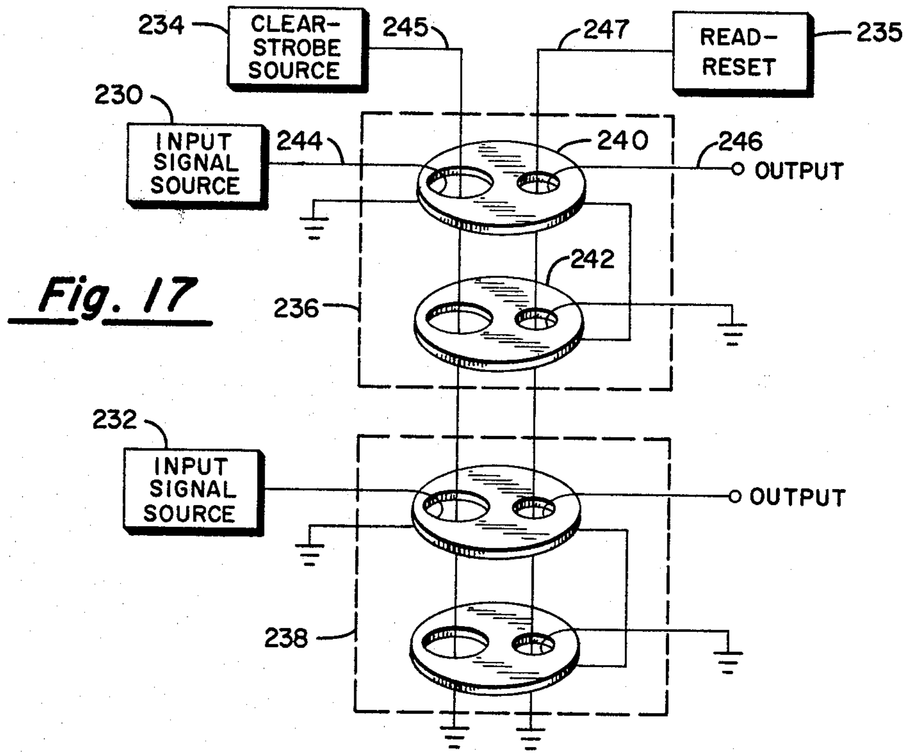
FIG. 17 is an illustration of a second embodiment of the present invention using transfluxors as the detector elements.
Figure 18:
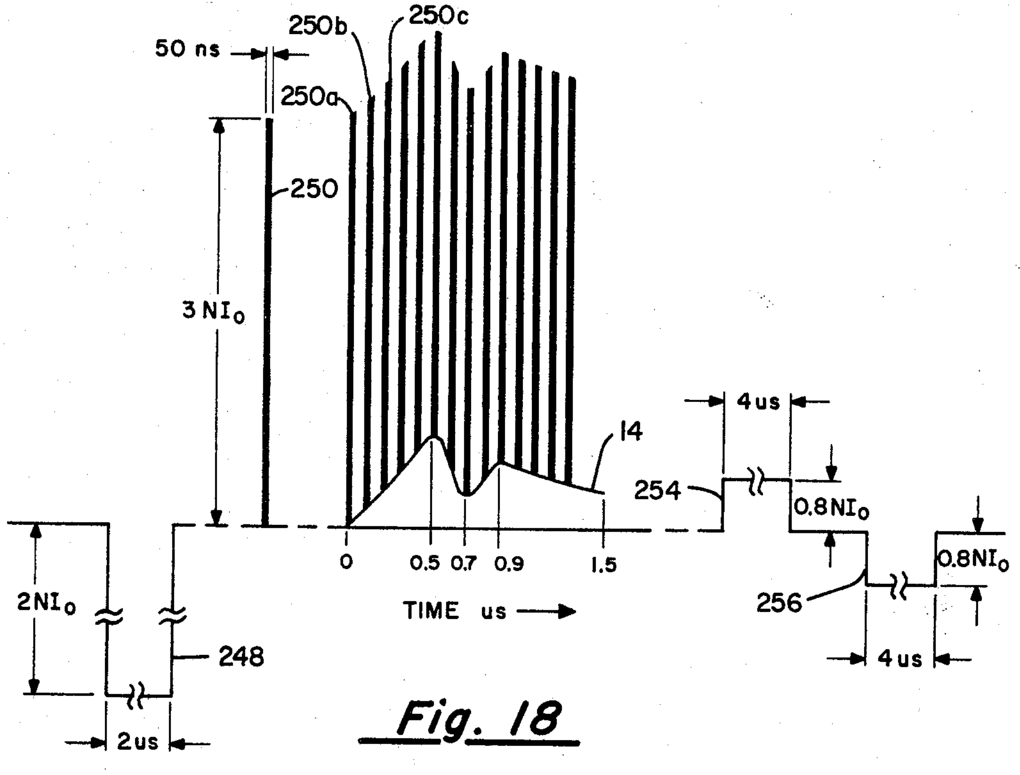
FIG. 18 is an illustration of the control signals associated with the embodiment of FIG. 17.

With particular reference to FIGS. 17 and 18 there is disclosed another embodiment of the present invention wherein the detectors are two-apertured transfluxors providing nondestructive readout of the information stored therein. Input signal sources 230 and 232 could be any constant current transient signal source but here are analogous to delays 22 and 28 while clear-strobe source 234 is analogous to delay 20-avalanche driver 30 and clear generator 52 and detectors 236 and 238 are analogous to detectors 34 and 40 of FIG. 1. Read-reset source 235 is analogous to the read-reset generator 44 of FIG. 1 and is required in the transfluxor detector to provide the read-reset signals that are coupled to the small apertures thereof. Detector 236, as does detector 238, includes two transfluxors; information transfluxor 240, and buck-out transfluxor 242. The signal defining the information to be stored in detector 236 is coupled only to the large aperture of transfluxor 240 in a first magnetic sense from source 230 by way of conductor 244 while the clear-strobe signal from source 234 is coupled to transfluxors 240 and 242 in the same first magnetic sense by way of conductor 245, the output conductor 246 is coupled to the small apertures of transfluxors 240 and 242 in the first and a second and opposite magnetic sense, respectively, and the read-reset signal is coupled to the small apertures of transfluxors 240 and 242 in the same first magnetic sense by way of conductor 247.

As with the arrangement of FIG. 15 the use of buck-out transfluxor 242 simplifies the readout process and allows a greater variation in strobe pulse characteristics as follows. Preparatory to the sampling operation the core defining periphery of the large apertures of transfluxors 240 and 242 are initially set into a clear state such as $-\phi_s$ of FIG. 12 by the coupling of clear pulse 248 to conductor 245. Next, for the sampling operation signal 14 is coupled to conductor 244 concurrently with the relatively delayed coupling of strobe pulse 250 to conductor 245. As the information signal is coupled only to the large aperture of transfluxor 240 and as the strobe pulse 250 is coupled to the large apertures of both transfluxors 240 and 242 each transfluxor is effected by a different magnetomotive force, the large aperture of transfluxor 242 which is effected only by strobe pulse 250 is, for example, placed in the $\phi_0$ state while the large aperture of transfluxor 240 which is effected by both signal 14 and the strobe pulse 250 is placed in a state of greater flux reversal such as for example $\phi_1$.

Upon readout, read-reset source 235 couples to conductor 247 read pulse 254, which is of the opposite magnetic sense as regards transfluxors 240 and 242 as is the clear pulse 248 and is coupled only to the small apertures of transfluxors 240 and 242, reverses in the leg between the large and small apertures that amount of flux reversed by the previously coupled signal 14 and strobe pulse 250 as regards transfluxor 240 and that amount of flux reversed by the previously coupled strobe pulse 250 as regards transfluxor 242. This change of the flux states of the flux about the small apertures of transfluxors 240 and 242 from $\phi_1$ and $\phi_0$, respectively, back to their original flux state $-\phi_s$ produces a net flux change $\phi_1-\phi_0$ effecting output conductor 246 due to the oppositely wound sense of conductor 246 about the small apertures of transfluxors 240 and 242. This difference flux then is the effective output-signal-producing-flux-change and accordingly produces an output signal in conductor 246 which is substantially independent of the strobe signal 250 characteristic and which is indicative of the amplitude of the sampled portion of signal 14.

After the readout operation read-reset source 235 couples to conductor 247 reset pulse 256, which has the same wave form characteristic as does read pulse 254 but of the opposite polarity, and which is coupled to the small apertures of transfluxors 240 and 242. Reset pulse 256 resets the flux reversed by the readout pulse 254 in the leg between the large and small apertures setting the flux states of transfluxors 240 and 242 back into their informational state prior to the readout operation. Subsequent coupling of readout pulse 254-reset pulse 256 to conductor 247 provide nondestructive readout on conductor 246 of the information stored in detector 236.

As with the above discussed operation of the system of FIG. 1, the signals from sources 230 and 232 could be signal 130 delayed various delay times while the strobe pulse 250 could be delayed preferably at least as long as the longest delay of signal 14. As illustrated in FIG. 1 with the use of fourteen detectors, such as detectors 236 and 238, and fourteen associated input sources such as input sources 230 and 232 a first input source delaying signal 14 a time $D=50$ ns. and each other input source providing a delay of an additional 100 ns. and with strobe pulse 250 being delayed an amount equal to the greatest delay of 1.35 $\mu$s. the successive magnetomotive forces of pulses 250*a*, 250*b*, 250*c*, etc., would be gated into detectors 236, 238, etc., at successively increasing delay times with respect to the wave front of signal 14.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A portable radiation hardened recording system, comprising:

sensor means;

recorder means;

said sensor means coupling to said recorder means a constant-current source type transient electrical signal having a varying amplitude for defining a sensed phenomenon;

said recorder means including;

magnetic clipper means, strobe-generator means, a plurality of various delay times delay means, and, a plurality of detector means, each of said detector means including a magnetizable memory element capable of being operated in an amplitude-limited, a time limited or a saturated condition;

a separate one of said detector means separately coupled to a separate one of said delay means forming delay-detector sets;

a strobe-generator means for generating a strobe pulse that has a time-limited switching charcteristic with respect to said magnetizable memory element.

said delay-detector sets and said strobe-generator means all coupled in parallel to said clipper means;

said clipper means coupling said transient signal from said sensor means to said parallel arranged delay-detector sets and said strobe-generator means and limiting the amplitude of said transient signal to the storage capacity of said detectors;

said strobe-generator means activated by said transient signal and simultaneously coupling a strobe pulse to each of said detectors means;

each of said detector means sampling a separate portion of said variously delayed transient signals when concurrently strobed by said strobe pulse; and, each of said sampled portions recorded in each of said separate detectors as a time-limited flux level, each flux level indicative of the amplitude of said transient signal at said sampled portion.

2. A portable radiation hardened recording system, comprising:

sensor means for providing a constant current source type transient signal having a varying amplitude for defining a sensed phenomenon;

recorder means for recording sampled portions of said transient signal including;

a plurality of delay means for providing a plurality of delay times, a plurality of detector means each separately coupled to a separate one of said delay means for forming a like plurality of delay-detector sets, strobe-generator means separately coupled to a separate one of said delay means for forming a delay-strobe-generator set, clipper means for limiting the maximum amplitude of said transient signal to the storage capacity of each of said detector means;

said plurality of delay-detector sets and said delay-strobe-generator set parallel arranged and common coupled to said clipper means the other end of which clipper means is coupled to said sensor means;

said clipper means coupling said transient signal from said sensor means to said parallel arranged delay-detector sets and said delay-strobe-generator set;

said strobe-generator means activated by said transient signal and simultaneously coupling a delayed constant current source type time-limited strobe pulse to all of said detector means;

each of said detector means storing a sampled portion of said transient signal that is concurrent in time with said strobe pulse and its respective delayed transient signal;

each of said detectors including a magnetizable memory element capable of being operated in an amplitude-limited, a time-limited or a saturated condition and initially placed in a saturated condition;

said strobe pulse individually capable of placing each of said detectors in a first time-limited flux condition from said initial saturated condition, said transient signal of an amplitude-duration characteristic insufficient to substantially effect said initial saturated condition; and, the concurrence in time of said strobe pulse and said respectively delayed transient signal at each detector causing each of said detectors to be placed in a time-limited condition flux level indicative of the amplitude of said transient signal at said sampled portion.

3. A portable radiation hardened recording system, comprising:

sensor means for providing a constant current source type transient signal having a varying amplitude for defining a sensed phenomenon;

recorder means for recording sampled portions of said transient signal including;

a plurality of delay means for providing a plurality of delay times;

a plurality of detector means each separately coupled to a separate one of said delay means for forming a like plurality of delay-detector sets;

strobe-generator means separately coupled to a separate one of said delay means for forming a delay-strobe-generator set;

said plurality of delay-detector sets and said delay-strobe-generator set parallel arranged and common coupled to said sensor means;

said strobe-generator means activated by said transient signal and simultaneously coupling a delayed constant current source type time-limited strobe pulse to all of said detector means;

each of said detector means storing a sampled portion of said transient signal that is concurrent in time with said strobe pulse and its respective delayed transient signal;

each of said detectors including a magnetizable memory element capable of being operated in an amplitude-limited, a time-limited or a saturated condition and initially placed in a saturated condition;

said strobe pulse individually capable of placing each of said detectors in a first time-limited flux condition from said initial saturated condition;

said transient signal of an ampltiude-duration characteristic insufficient to substantially effect said initial saturated condition; and, the concurrence in time of said strobe pulse and said respectively delayed transient signal at each detector causing each of said detectors to be placed in a time-limited condition flux level indicative of the amplitude of said transient signal at said sampled portion.

4. A portable radiation-hardened recording system, comprising:

sensor means for providing an electrical output signal having a varying amplitude that is representative of a measured phenomenon;

a plurality of delay means coupled in parallel to said electrical output signal for delaying said output signal for providing a plurality of delayed output signals;

a plurality of magnetizable detector means each coupled by a separate one of said delayed output signals;

a strobe-generator means activated by a first of said delayed output signals for providing a delayed strobe signal output having a partial-switching characteristic with respect to said detector means;

a plurality of magnetizable detector means each coupled by a separate one of said delayed output signals;

each of said detector means recording a signal level characteristic of said electrical output signal as a corresponding flux level when sampled by said strobe signal; and, each of said recorded characteristics consisting of the relative amplitude of said electrical output signal at each of said plurality of delay times.

5. A portable radiation-hardened recording system, comprising:

sensor means for providing a constant current source type electrical output signal having a varying amplitude that is representative of a measured phenomenon;

clipping means for limiting the maximum amplitude of said electrical output signal;

a plurality of delay means coupled in parallel to said clipping means for delaying said electrical output signal providing corresponding delayed output signals;

a plurality of magnetizable detector means each coupled to a separate one of said delayed output signals;

a strobe-generator means activated by said electrical output signal for providing a delayed constant current source type strobe signal output pulse that has a time-limited switching characteristic with respect to said detector means;

each of said detector means recording a sampled portion of said electrical output signal as a respective time-limited flux level when strobed by said strobe signal; and, each of said recorded sample portion including the relative amplitude of said electrical output signal at each of said plurality of sampled portion delay times.

6. A portable radiation-hardened recording system, comprising:

sensor means for providing a constant current source type electrical output signal having a varying amplitude that is representative of a measured phenomenon;

a plurality of delay means all coupled in parallel by said electrical output signal for providing a plurality of delayed output signals;

a plurality of magnetizable detector means one each coupled to a separate one of said delayed output signals;

a strobe-generator means activated by one of said delayed output signals for providing a delayed constant current source type strobe signal output pulse that has a time-limited switching characteristic with respect to said detector means;

a plurality of magnetizable detector means one each coupled to a separate one of said delayed output signals;

each of said detector means recording a separate sampled portion of said electrical output signal when concurrently effected by said strobe signal and said electrical output signal; and each of said recorded separate sampled portions including the amplitude of said electrical output signal at said concurrently effected strobe signal at said plurality of delay times.

7. A portable radiation-hardened recording system, comprising:

sensor means for providing a constant current source type transient signal having a varying amplitude that is representative of a detected phenomenon;

a plurality of delay means all coupled in parallel to said transient signals for delaying said transient signal a plurality of delay times for providing a like plurality of delayed transient signals;

a plurality of magnetizable detector means each coupled to a separate one of said plurality of delayed transient signals;

a strobe-generator means coupled to said sensor means and activated by said transient signal for providing a delayed constant current source type strobe signal output pulse that has a time-limited switching characteristic with respect to said detector means;

each detector means detecting a separate sample of said transient signal amplitude when strobed by said delayed strobe signal; and, each of said separate samples of the amplitude of said transient signal at each of said plurality of delay times being stored in said respective detectors as a respective time-limited flux level.

8. A portable radiation-hardened recording system, comprising:

sensor means for providing a constant current source type transient signal having a varying amplitude that is representative of a detected phenomenon;

a plurality of delay means all coupled in parallel to said sensor means for delaying said transient signal a plurality of delay times for providing a plurality of delayed transient signals;

a plurality of magnetizable detector means each separately coupled to a separate one of said plurality of delay means;

a strobe-generator means coupled to said sensor means and activated by said transient signal for providing a constant current source type strobe signal output pulse that has a time-limited switching characteristic with respect to said detector means;

a plurality of detector means each separately coupled to a separate one of said plurality of delay means;

each detector means sampling and recording a separate amplitude portion of said transient signal when strobed by said strobe signal; and, each of said separately recorded amplitude portions including the relative amplitude of said transient signal at each of said delay times.

9. A portable radiation-hardened recording system, comprising:

sensor means;

recorder means;

said sensor means coupling to said recorder means a constant current source type transient electrical signal output having a varying amplitude for defining a sensed phenomenon;

said recorder means including;

magnetizable clipper means for limiting the maximum amplitude of said transient signal to a predetermined level, a plurality of parallel arranged delay means all coupled in parallel to said clipper means for delaying said transient signal a plurality of delay times for providing a plurality of corresponding delayed transient signals, a plurality of magnetizable detector means each separately coupled to a separate one of said plurality of delay means, a strobe-generator means coupled in parallel with said plurality of parallel arranged delay means for providing a constant current source type delayed strobe signal output pulse that has a time-limited, switching characteristic with respect to said detector means, said strobe signal coupled to all of said detector means;

each of said detector means sampling and recording a separate portion of said transient signal when strobed by strobe signal; and, readout means selectively reading out the recorded sampled portions of said transient signal from said detector means.

10. A portable radiation-hardened recording system, comprising:

sensor means;

recorder means;

said sensor means coupling to said recorder means a constant current source type transient electrical signal output having a varying amplitude for defining a sensed phenomenon;

said recorder means including;

clipper means for limiting the maximum amplitude of said transient signal, a plurality of parallel arranged delay means all coupled in parallel to said clipper means for delaying said transient signal a like plurality of delay times for providing a like plurality of corresponding delayed transient signals, a plurality of magnetizable detector means each separately coupled to a separate one of said plurality of delay means;

a strobe-generator means coupled in parallel with said plurality of parallel arranged delay means for providing a delayed constant current source type strobe signal output pulse that has a time-limited switching characteristic with respect to said detector means, said strobe signal parallel coupled to all of said detector means;

each of said detector means sampling and recording a separate portion of said transient signal when strobed by said strobe signal as a time-limited flux level representative of the amplitude of the sampled portion of said transient signal; and readout means selectively reading out the recorded sampled portions of said transient signal from said detector means.

11. The method of providing in a nuclear-radiation environment a radiation-hardened recording of a transient electrical signal having a varying amplitude that is prepresentative of a measured phenomenon comprising the steps of:

coupling to a plurality of magnetizable detectors a transient electrical signal having a varying amplitude that is representative of the varying intensity of the environmental nuclear-radiation.

concurrently coupling to each of said detectors an associated strobe pulse having a time-limited switching characteristic with respect to the associated detector;

delaying, at each of said associated detectors, said associated strobe pulse with respect to said concurrently coupled electrical signal;

the concurrence of said electrical signal and the associated strobe pulse at the associated detector detecting a sampled portion of said electrical signal;

storing in each of said associated detectors an associated time-limited flux level, which flux level is representative of the amplitude of the said sampled portion of said electrical signal.

12. The method of providing in a nuclear-radiation environment a radiation-hardened recording of a transient electrical signal having a varying amplitude that is representative of a measured phenomenon, comprising the steps of:

generating a transient electrical signal having a varying amplitude that is representative of the varying intensity of the environmental nuclear-radiation;

coupling said electrical signal to a plurality of magnetizable detectors;

coupling a strobe signal to an associated one of said detectors, each associated strobe signal having a time-limited switching characteristic with respect to said associated detector;

delaying each associated strobe signal with respect to said electrical signal at each of said associated detectors;

storing in each of said associated detectors an associated partially-switched flux level, which flux level is a function of the amplitude of said electrical signal at the time of the coupling of said strobe signal to said associated detector.

13. The method of providing in a nuclear-radiation environment a radiation-hardened recording of a transient electrical signal having a varying amplitude that is representative of a measured phenomenon, comprising the steps of:

generating a transient electrical signal having a varying amplitude that is representative of the intensity of said burst of radiant energy;

coupling said electrical signal to a plurality of magnetizable detectors;

coupling a strobe signal to an associated one of said detectors, each associated strobe signal having a time-limited switching characteristic with respect to said associated detector;

delaying each associated strobe signal with respect to said electrical signal at each of said associated detectors;

storing in each of said associated detectors an associated time-limited flux level, which flux level is a function of the amplitude of said electrical signal at the time of the coupling of said strobe signal to said associated detector.

14. The method of providing in a nuclear-radiation environment a radiation-hardened recording of a transient electrical signal having a varying amplitude that is representative of a measured phenomenon comprising the steps of:

generating a transient electrical signal whose varying amplitude is representative of the varying radiation intensity effects of a burst of radiation;

coupling said electrical signal to a plurality of magnetizable detectors;

generating a strobe pulse in response to said burst;

delaying said strobe pulse a plurality of delay times with respect to said electrical signal for generating a plurality of different delay time strobe pulses;

coupling each of said different delay time strobe pulses to an associated one of said detectors, each of said strobe pulses having a time-limited switching characteristic with respect to the associated detector;

storing in each of said associated detectors an associated time-limited flux level, which flux level is representative of the amplitude of the portion of said electrical signal that is concurrent in time with the associated strobe pulse.

15. The method of providing in a nuclear-radiation environment a radiation-hardened recording of a transient electrical signal having a varying amplitude that is representative of a measured phenomenon comprising the steps of:

generating a transient electrical signal whose varying amplitude represents the varying radiation intensity of a nuclear radiation burst;

coupling said electrical signal to a plurality of magnetizable detectors;

coupling to each of said detectors, in response to said burst, an associated strobe pulse having a time-limited switching characteristic with respect to the associated detector;

delaying, at each of said associated detectors, said associated strobe pulse with respect to said electrical signal;

storing in each of said associated detectors an associated time-limited flux level, which flux level is representative of the amplitude of said electrical signal that is concurrent in time with the associated delayed strobe pulse.

16. A radiation hardened recording system, comprising:
sensor means;
recorder means including a plurality of parallel arranged magnetizable detector means;
readout means;
said sensor means providing a transient electrical signal having a varying amplitude that is representative of a detected phenomenon;
means for causing said recorder means to record in said parallel arranged detector means separate sampled portions of said transient signal as respectively associated time-limited flux levels, said separate sampled portions defining, point by point, the waveform of said transient signal; and
said readout means selectively reading out of said detector means the sampled portions of said transient signal.

17. A radiation hardened recording system, comprising:
sensor means;
recorder means including at least two parallel arranged magnetizable memory elements capable of being operated in an amplitude-limited, a time-limited or a saturated condition;
readout means;
said sensor means providing a constant current source type transient electrical signal having a varying amplitude that is representative of a detected phenomenon;
means for causing said recorder means to record in said parallel arranged detector means separate sampled portions of said transient signal as respectively associated time-limited flux levels, said separate sampled portions defining, point by point, the waveform of said transient signal; and
said readout means selectively reading out of said detector means the flux levels representative of said transient signal sampled portions.

18. A portable radiation-hardened recording system, comprising:
sensor means for providing an electrical signal having a varying amplitude that is representative of a measured phenomenon;
a plurality of magnetizable detector means;
strobe-generator means activated by said electrical signal for coupling a strobe signal that has a partial switching characteristic with respect to said detector means to each of said detector means;
a plurality of delay means coupled to said sensor means for delaying said strobe signals a plurality of delay times with respect to said electrical signal; and,
each of said detector means caused to record an amplitude level of said electrical signal as a corresponding partially-switched flux level when strobed by said strobe signal.

19. A portable radiation-hardened recording system, comprising:
sensor means for providing an electrical signal having a varying amplitude that is representative of a measured phenomenon;
a plurality of delay means coupled to said sensor means for delaying said electrical signal a plurality of delay times;
a plurality of magnetizable detector means, each coupled to an associated one of said delay means;
strobe-generator means for coupling a delayed strobe signal that has a time-limited switching characteristic with respect to said detector means to each of said detector means upon activation by said delayed electrical signal; and
each of said detector means recording the amplitude of a separate sampled portion of said electrical signal as a corresponding time-limited flux level when sampled by said strobe signal.

20. A portable radiation-hardened recording system, comprising:
sensor means for providing an electrical signal having a varying amplitude that is representative of a measured phenomenon;
a plurality of delay means coupled to said sensor means for delaying said electrical signal a plurality of delay times;
a plurality of magnetizable detector means;
strobe-generator means for coupling a strobe signal that has a time-limited switching characteristic with respect to said detector means to each of said detector means upon activation by said delayed electrical signals at each of said plurality of delay times; and
each of said detector means recording a signal level characteristic of said electrical signal as a time-limited flux level when strobed by said strobe signal.

References Cited

UNITED STATES PATENTS

| | | | |
|---|---|---|---|
| 2,817,815 | 12/1957 | Evans | 324—77 |
| 2,881,255 | 4/1959 | Hall | 179—15 |
| 2,896,193 | 7/1959 | Herrmann | 340—174 |
| 2,896,194 | 7/1959 | Crane | 340—174 |
| 3,007,140 | 10/1961 | Minnick | 340—174 |
| 3,063,014 | 11/1962 | Shanks | 328—28 |

RODNEY D. BENNETT, *Primary Examiner.*

C. E. WANDS, *Assistant Examiner.*

U.S. Cl. X.R.

250—83.3

UNITED STATES PATENT OFFICE

CERTIFICATE OF CORRECTION

Patent No. 3,432,818 March 11, 1969

Charles W. Lundberg et al.

It is certified that error appears in the above identified patent and that said Letters Patent are hereby corrected as shown below:

Column 17, lines 13 and 14, cancel "a plurality of magnetizable detector means each coupled by a separate one of said delayed output signals;"; lines 65 to 67, cancel "a pluralit of magnetizable detector means one each coupled to a separate one of said delayed output signals;". Column 18, lines 42 and 43, cancel "a plurality of detector means each separately coupled to a separate one of said plurality of delay means;".

Signed and sealed this 20th day of October 1970.

(SEAL)
Attest:

Edward M. Fletcher, Jr.
Attesting Officer

WILLIAM E. SCHUYLER, JR.
Commissioner of Patents